Figure 5:
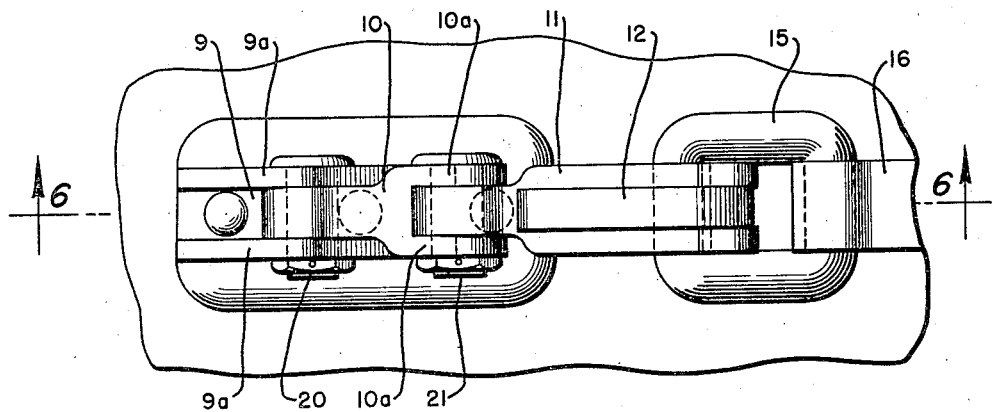

Jan. 4, 1949. P. F. SMITH 2,458,212
PARACHUTE DEPLOYING MEANS
Filed Dec. 28, 1945 2 Sheets-Sheet 1
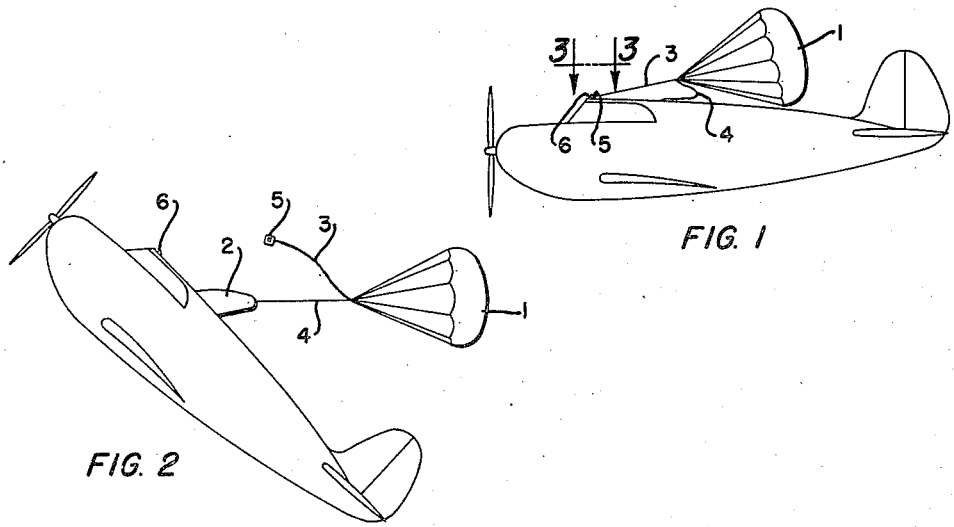
FIG. 1
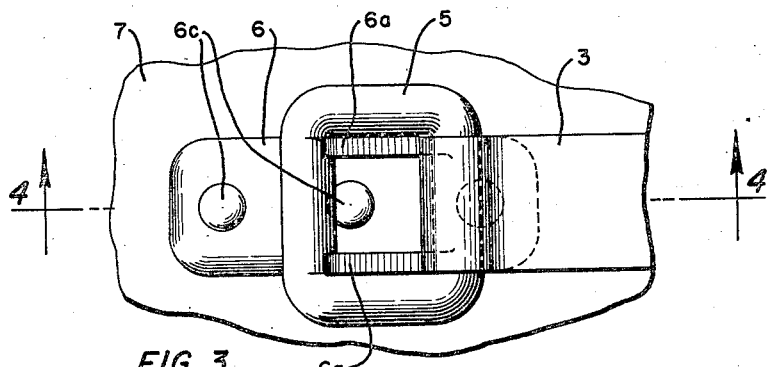
FIG. 2
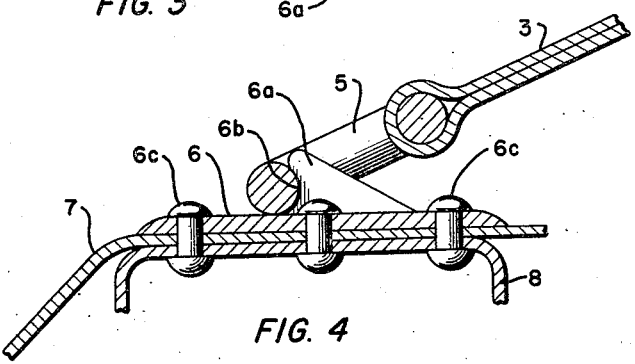
FIG. 3
FIG. 4
INVENTOR.
PREVOST F. SMITH
BY
A. B. Bowman
ATTORNEY Jan. 4, 1949.　　　　　P. F. SMITH　　　　　2,458,212
PARACHUTE DEPLOYING MEANS
Filed Dec. 28, 1945　　　　　　　　　　　2 Sheets-Sheet 2

INVENTOR.
PREVOST F. SMITH
BY
*A. B. Bowman*
ATTORNEY

Patented Jan. 4, 1949

2,458,212

UNITED STATES PATENT OFFICE 2,458,212

PARACHUTE DEPLOYING MEANS

Prevost F. Smith, San Diego, Calif.

Application December 28, 1945, Serial No. 637,516

4 Claims. (Cl. 244—139)

My invention relates to a parachute deploying means more particularly for use in connection with airplanes for safely landing the same when disabled and the objects of my invention are:

First, to provide a means of this class which is arranged to change the flight attitude of the airplane to which it is connected so that the main parachute in connection therewith may be released and deployed clear of the tail assembly of the airplane;

Second, to provide a means of this class which automatically deploys the main parachute in connection with the airplane when the airplane assumes an inclined attitude whereby the main parachute is deployed rearwardly and above the tail assembly of the airplane insuring operation of the main parachute which is arranged to safely lower the disabled airplane;

Third, to provide a means of this class in which a pilot parachute is released by the pilot of the airplane for changing the flight attitude of the airplane and automatically releasing the main parachute when the angle of the axis of the airplane reaches a certain value with respect to the attaching cord in connection with the pilot parachute;

Fourth, to provide a means of this class which is so designed that the main parachute may be stowed forward of the tail assembly relatively near the center of gravity of the airplane and may be deployed from the airplane at an angle out of interference with the tail assembly;

Fifth, to provide a means of this class which changes the flight attitude of the airplane preliminary to releasing the main parachute whereby the airplane is slowed down and the air flow thereby is quite turbulent in the area behind the aircraft providing very favorable conditions for the opening of the main parachute which may be of relatively light construction due to the reduced speed and turbulent airflow;

Sixth, to provide a means of this class in which a pilot parachute is connected to the airplane in spaced relation to the center of gravity so that the pilot parachute, when released, creates sufficient drag in spaced relation to the center of gravity in connection with the airplane to change the flight attitude of the airplane and slow the same down preliminary to the release of the main parachute which is accomplished automatically when the airplane reaches a certain flight attitude with respect to its forward flight direction;

Seventh, to provide a means of this class in which the pilot parachute is provided with two cords, one of which is connected to the airplane and the other to a main parachute stored in connection with the aircraft whereby the pilot parachute may be released and cause the airplane to change its flight attitude whereupon the cord interconnecting the pilot parachute and the airplane is released causing the pilot parachute to exert tension on the cord interconnecting the main parachute and the pilot parachute for releasing the main parachute while the airplane is in an angular attitude; and Eighth, to provide a parachute deploying means of this class which is very simple and economical of construction, efficient in its action and which will not readily deteriorate or get out of order.

Figure 6:
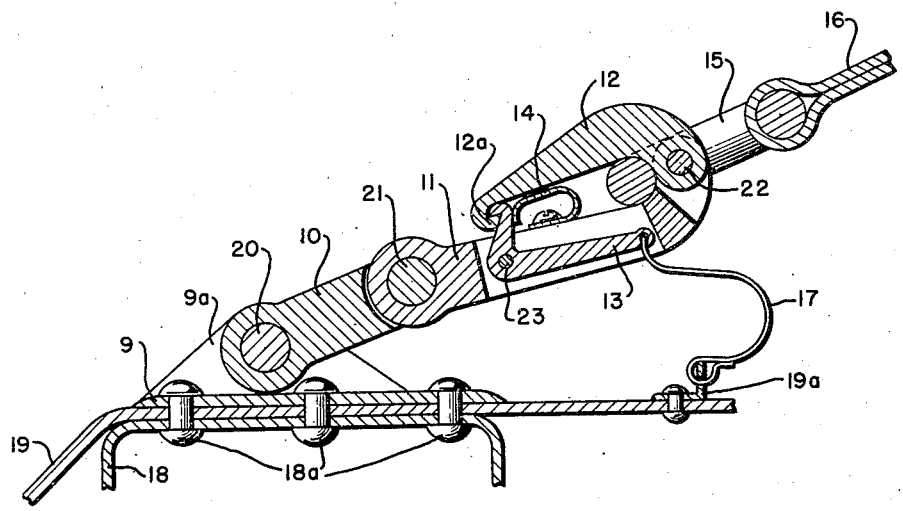

With these and other objects in view as will appear hereinafter, my invention consists of certain novel features of construction, combination and arrangement of parts and portions, and a certain modification as will be hereinafter described in detail and particularly set forth in the appended claims, reference being had to the accompanying drawings and to the characters of reference thereon, forming a part of this application in which:

Figure 1 is a side elevational view of an airplane in normal flight with my parachute deploying means in connection therewith, illustrating the pilot parachute in open position immediately after release; Fig. 2 is a side elevational view of an airplane showing my parachute deploying means in connection therewith after the aircraft has assumed an angular attitude caused by the drag of the pilot parachute and showing the pilot parachute releasing the main parachute; Fig. 3 is an enlarged fragmentary top or plan view taken from the line 3—3 of Fig. 1; Fig. 4 is a fragmentary sectional view taken from the line 4—4 of Fig. 3, showing parts in elevation to facilitate the illustration; Fig. 5 is an enlarged fragmentary top or plan view of a modified form of the latch mechanism of my parachute deploying means, illustrating the structure in a similar manner to that as shown in Fig. 3 of the drawings; and Fig. 6 is a fragmentary sectional view taken from the line 6—6 of Fig. 5, showing parts in elevation to facilitate the illustration.

Similiar characters of reference refer to similar parts and portions throughout the several views of the drawings.

The pilot parachute 1, main parachute 2, cords 3 and 4, cord link 5, hook member 6, and the structural members 7 and 8 constitute the principal parts and portions of my parachute deploying means.

The pilot parachute 1, as shown in Fig. 1 of the drawings, is packed and stored near the pilot's compartment of the airplane and is arranged to be released by the pilot of the airplane as desired. Connected to this pilot parachute 1 is the cord 4 which is connected at its opposite end to the main parachute 2 which is stored in the airplane near the pilot's compartment, as shown best in Fig. 2 of the drawings. The cord 3 interconnecting the pilot parachute 1 and the cord link 5, as shown in Fig. 1 of the drawings, operates to exert drag in connection with the airplane when pilot parachute 1 is first released. The cord link 5, as shown in Fig. 3 of the drawings, is arranged to engage the hook portions 6a of the hook member 6, which is secured by rivets 6c to the structural members 7 and 8 in connection with the frame of the airplane to which my parachute deploying means is connected. As shown in Figs. 1 and 2 of the drawings, the hook member projects above the pilot's compartment of the airplane and above the center of gravity of the airplane for applying the drag of the pilot parachute 1 over the center of gravity and causing the airplane to assume the angular attitude, as shown in Fig. 2 of the drawings.

The operation of my parachute deploying means is substantially as follows:

When the pilot parachute 1 is released by the pilot of the airplane, it opens, as shown in Fig. 1 of the drawings, creating tension in connection with the cord 3 and cord link 5 which is secured on the recess portion 6b of the hook member 6a. This pilot parachute in the air stream creates considerable drag imposing considerable leverage over the center of gravity of the airplane in connection with the hook member 6, whereby the airplane is caused to change its flight attitude to an angular relationship as shown in Fig. 2 of the drawings, whereupon the cord link 6 slips out of the recess portion 6b releasing the cord 3 from the airplane and creating tension in the cord 4 interconnecting the pilot parachute 1 and the main parachute 2, which causes the main parachute 2 to be pulled out of its pack in the airplane 1 and to be deployed above and rearwardly of the tail surfaces of the airplane whereby it is not entangled in connection with any of the airplane structure. Thus the disabled airplane is safely lowered to the ground.

In the modification, as shown in Figs. 5 and 6 of the drawings, the parts are designed as follows:

The base 9, link 10, hook members 11 and 12, latch member 13, spring 14, cord link 15, cord 16, latch cord 17, structural members 18 and 19, and the pins 20 to 23 inclusive.

The base 9 is connected to the structural members 18 and 19 by the rivet 18a. It will be here noted that the structural members 18 and 19 correspond to the structural members 8 and 7 respectively as shown in Fig. 4 of the drawings. Pivotally connected to the base 9 is the link 10 arranged in pivotal relationship with the pin 20 secured in the upwardly extending bracket portion 9a of the base 9. The hook member 11 is connected to the bifurcated end 10a of the link 10 by means of the pin 21. Pivotally connected to the hook member 11 by means of the pin 22 is the hook member 12. This hook member 12 is provided with a latch portion 12a on its movable end engageable with the latch member 13 which is pivotally mounted on the pin 22 in connection with the hook member 11. The latch member 13 is connected to the structural member 19 by the bracket 19a and the latch cord 17 which is a flexible member. It will be noted that the cord link 15 is engaged by the hook members 11 and 12 when latched in the solid line position as shown in Fig. 6 of the drawings. The cord 16, in connection with the cord link 15, is substantially the same as the cord 3, as disclosed in Figs. 1 to 4 of the drawings, and serve the same operation.

The operation of the modified form of my parachute deploying means is substantially as follows:

When the pilot parachute is released in connection with the cord 16 and slows the airplane down, changing the flight attitude thereof, the diverging angle of the cord 16 with the axis of the aircraft causes the latch cord 17 to be pulled taut and release the latch portion 12a of the hook member 12 from the latch member 13. The hook member 12 then pivots on the pin 22 releasing the cord link 15 together with the cord 16, whereby the pilot parachute exerts tension on the main parachute, as described in connection with Figs. 1 and 2 of the drawings. The spring 14, in engagement with the latch member 13, maintains the latch member 13 in engagement with the latch portion 12a of the hook 12 until released by tension of the cord 17.

Though I have shown and described a particular construction, combination and arrangement of parts and portions, and a certain modification, I do not wish to be limited to the particular construction, combination and arrangement, nor to the modification but desired to include in the scope of my invention the construction, combination and arrangement substantially as set forth in the appended claims.

Having thus described my invention, what I claim as new and desire to secure by Letters Patent is:

1. In a parachute deploying means of the class described, the combination of an airplane, a pilot parachute, a first and second cord in connection with said pilot parachute, a cord link in connection with said first cord, and a main parachute in connection with said second cord, pivoted hook means in connection with said airplane engageable with said cord link, a latch member in connection with said pivoted hook means arranged to hold the same in engagement with said cord link and a latch cord interconnecting said latch member and the structure of said airplane for releasing said hook members when forced into a widening diverged relation whereby said latch cord trips said latch member and releases said hook member disengaging the same from said cord link, whereby the pilot parachute is released from the structure of the airplane and exerts tension on said second cord in connection with the main parachute for deploying the same upwardly and rearwardly of the airplane.

2. In a parachute deploying means of the class described, the combination of an airplane, a pilot parachute, a first and second cord in connection with said pilot parachute, a cord link in connection with said first cord, and a main parachute in connection with said second cord, pivoted hook means in connection with said airplane engageable with said cord link, a latch member in connection with said pivoted hook means arranged to hold the same in engagement with said cord link and a latch cord interconnecting said latch member and the structure of said airplane for releasing said hook members when forced into a widening diverged relation whereby said latch cord trips said latch member and releases said hook member disengaging the same from said cord link, whereby the pilot parachute is released from the structure of the airplane and exerts tension on said second cord in connection with the main parachute for deploying the same upwardly and rearwardly of the airplane, and a second link interconnecting said pivoted hook means and the structure of said airplane.

3. In a parachute deploying means of the class described, the combination of an airplane, a pilot parachute, a first and second cord in connection with said pilot parachute, a cord link in connection with said first cord, and a main parachute in connection with said second cord, pivoted hook means in connection with said airplane engageable with said cord link, a latch member in connection with said pivoted hook means arranged to hold the same in engagement with said cord link and a latch cord interconnecting said latch member and the structure of said airplane for releasing said hook members when forced into a widening diverged relation whereby said latch cord trips said latch member and releases said hook member disengaging the same from said cord link, whereby the pilot parachute is released from the structure of the airplane and exerts tension on said second cord in connection with the main parachute for deploying the same upwardly and rearwardly of the airplane, and a second link interconnecting said pivoted hook means and the structure of said airplane, and said latch member pivoted in connection with said first mentioned pivoted hook means.

4. In a parachute deploying means of the class described, the combination of an airplane, a pilot parachute, a first and second cord in connection with said pilot parachute, a cord link in connection with said first cord, and a main parachute in connection with said second cord, pivoted hook means in connection with said airplane engageable with said cord link, a latch member in connection with said pivoted hook means arranged to hold the same engagement with said cord link and a latch cord interconnecting said latch member and the structure of said airplane for releasing said hook members when forced into a widening diverged relation whereby said latch cord trips said latch member and releases said hook member disengaging the same from said cord link, whereby the pilot parachute is released from the structure of the airplane and exerts tension on said second cord in connection with the main parachute for deploying the same upwardly and rearwardly of the airplane, and said latch member pivoted in connection with said pivoted hook means rearwardly of the connection of said cord link with said pivoted hook means.

PREVOST F. SMITH.

REFERENCES CITED

The following references are of record in the file of this patent:

UNITED STATES PATENTS

| Number | Name | Date |
|---|---|---|
| 2,050,324 | Hoffman | Aug. 11, 1936 |
| 2,396,921 | Leslie | Mar. 19, 1946 |

FOREIGN PATENTS

| Number | Country | Date |
|---|---|---|
| 284,348 | Germany | May 20, 1915 |